July 14, 1964 A. W. WHITTON, JR., ETAL 3,140,715
FORCEPS
Filed Sept. 19, 1960
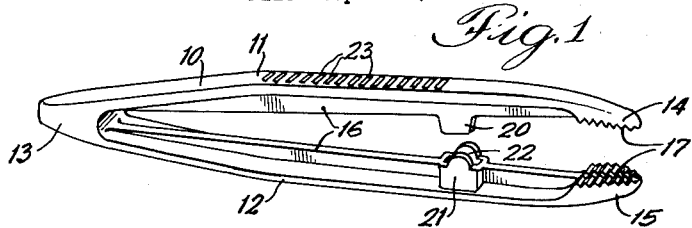
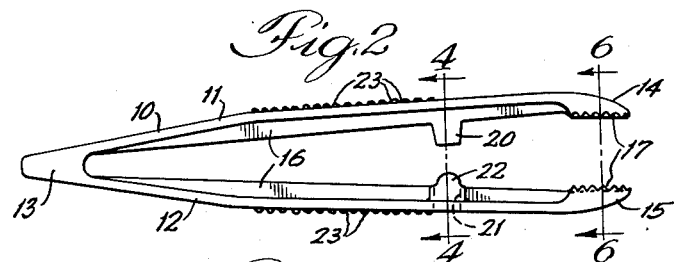
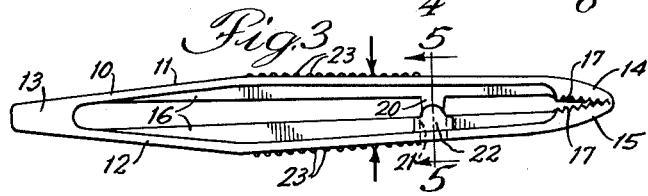
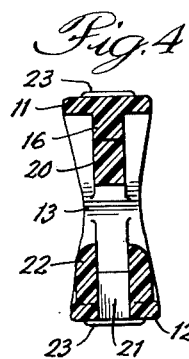
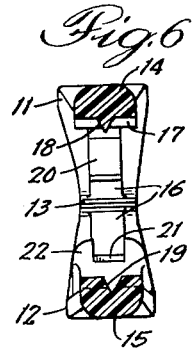
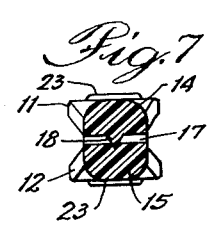
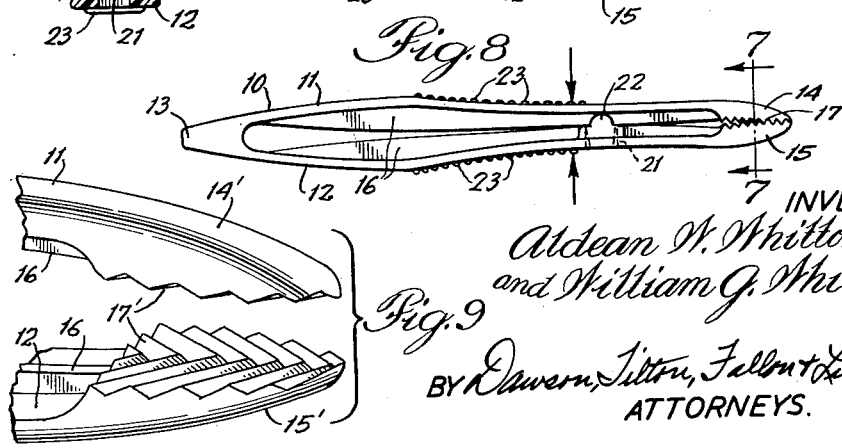
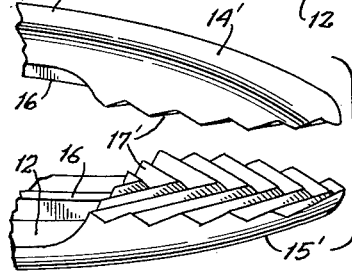
INVENTORS:
Aldean W. Whitton Jr.
and William G. Whitney,
BY Dawson, Tilton, Fallon + Lungmus,
ATTORNEYS.

United States Patent Office 3,140,715
Patented July 14, 1964

3,140,715
FORCEPS
Aldean W. Whitton, Jr., Glenview, and William G. Whitney, Evanston, Ill., assignors to American Hospital Supply Corporation, Evanston, Ill., a corporation of Illinois
Filed Sept. 19, 1960, Ser. No. 56,886
3 Claims. (Cl. 128—321)

This invention relates to forceps, and more specifically, to an improved forceps formed from plastic material.

The use of articles and instruments formed from plastic rather than metal has become increasingly popular in hospitals and other institutions, especially where the use of plastic renders it economically practical to dispose of such articles after use rather than to clean and resterilize them. Also, because of their relative inexpensiveness, plastic articles reduce some of the substantial hospital expenses arising because of the loss or pilfering of articles and because of the administrative control required to keep such losses to a minimum.

Despite the relative cheapness and disposability of plastic articles, the different physical properties of metals and plastics has, in some cases, made the substitution impractical or undesirable. It is largely for this reason that plastics have not been considered suitable for use in the manufacture of forceps. Should soft or relatively yieldable plastic materials be used in the construction of forceps, the jaws of such an instrument might easily be displaced laterally and make only partial contact as they are closed. On the other hand, a harder and less easily distortable plastic would ordinarily be too brittle to withstand the forces normally applied to and by such forceps. As a result, forceps are still commonly formed from relatively expensive metal rather than plastic and the administrative problems of control, cleaning and sterilization continue.

A principal object of the present invention is to provide an improved forceps construction which is of particular value when such forceps are formed from plastic materials. Another object is to provide plastic forceps capable of firmly gripping an article or element without lateral displacement of the jaws should turning or twisting forces be applied to that element. Another object is to provide a pair of plastic forceps constructed to operate with a two-stage closing action, the first stage comprising the bringing together and alignment of the jaws and the second stage comprising the clamping action and the locking of the jaws against lateral displacement. A still further object is to provide a pair of forceps with means for positively locking the jaws against relative lateral displacement as soon as a substantial clamping force has been applied to those jaws. Another object is to provide a forceps of unique tooth arrangement, the teeth of the respective jaws interlocking to prevent lateral jaw displacement when the jaws are closed.

Other objects will appear from the specification and drawings in which:

FIGURE 1 is a perspective view of a forceps embodying the present invention;

FIGURE 2 is a side elevational view of the forceps in open condition;

FIGURE 3 is a side elevational view similar to FIGURE 2 but showing the forceps in partially closed condition;

FIGURE 4 is an enlarged sectional view taken along line 4—4 of FIGURE 2;

FIGURE 5 is an enlarged sectional view taken along line 5—5 of FIGURE 3;

FIGURE 6 is an enlarged cross sectional view taken along line 6—6 of FIGURE 2;

FIGURE 7 is an enlarged cross sectional view taken along line 7—7 of FIGURE 8;

FIGURE 8 is a side elevational view similar to FIGURE 3 but showing the forceps in fully closed condition; and FIGURE 9 is a broken perspective view showing a modified tooth construction for forceps embodying the present invention.

In the embodiment of the invention illustrated in the drawings, the numeral 10 generally designates a pair of forceps having upper and lower arms 11 and 12. A pair of corresponding ends of the arms are secured together by a connecting portion 13 and the opposite ends of the arms are provided with jaws 14 and 15. Most desirably, the entire article is molded or otherwise formed from a suitable plastic material. Polystyrene has been found particularly suitable although other materials such as cellulose acetate, polyethylene, cellulose nitrate and other plastic materials having the desired characteristics of strength and flexibility might also be used.

Viewed in section, arms 11 and 12 are generally T-shaped, having longitudinal ribs 16 extending along their inner opposing surfaces. As shown most clearly in FIGURES 2 and 3, these ribs extend substantially the full length of the arms between the jaws 14, 15 and the connecting portion 13. It will be noted, however, that the rear portion of each rib tapers rearwardly and that, as a result, the stiffening effect produced by the ribs diminishes adjacent connecting portion 13.

Normally, the integrally-formed arms diverge forwardly from connecting portion 13 so that jaws 14 and 15 are spaced substantially apart, as shown in FIGURE 2. It will be observed that the tooth-providing faces of these jaws extend along substantially parallel planes when the arms are in their normal or relaxed positions. As pressure is applied to the flexible arms to urge them towards each other, the initial bending or flexing occurs primarily adjacent the connecting portion 13, the arms 11 and 12 remaining substantially straight. Consequently, when the jaws make contact with each other, such contact occurs only at their tips in the absence of any further force tending to bow the flexible arms inwardly towards each other. When the tips of the jaws come into contact, the remaining portions of those jaws, as well as the longitudinal ribs 16 of arms 11 and 12, are still spaced a substantial distance apart (FIGURE 3). It is only upon the application of increased force sufficient to cause a bending of the reinforcing ribs 16 that the ribs of the respective jaws are urged into contact and the teeth of the upper and lower jaws fully mesh.

Each of the jaws 14 and 15 is provided with transversely extending teeth which are staggered so that intermeshing occurs when the jaws are brought together. Such an arrangement results in jaws which have an extremely firm gripping action and which hold tenaciously to articles, tissues or other materials as the closed forceps is moved longitudinally.

In addition to the transversely elongated teeth, jaws 14 and 15 are provided with mating elements which prevent or restrain lateral displacement of the jaws when the teeth are intermeshed. As shown most clearly in FIGURES 6 and 7, jaw 14 is provided with a centrally disposed longitudinally extending tooth 18 and jaw 15 is provided with a V-shaped longitudinally extending groove 19 adapted to receive the longitudinal tooth of the upper jaw. Since the groove 19 and the tooth 18 extend substantially the entire length of each jaw, the jaws will be interlocked against lateral movement from the moment they make contact with each other assuming, of course, that upon initial engagement they are in register with each other.

Between jaw 14 and connecting portion 13, the longitudinal rib 16 of the upper arm is provided with an integral depending projection 20. Similarly, the rib of the lower arm 12 is provided with a socket 21 for receiving projections 20 when the jaws are closed. On each side of the socket are a pair of upstanding ears 22, each of the ears projecting above the rib 16 of arm 12 a distance corresponding substantially with the height of that rib in the vicinity of the socket. Since the ribs of the two arms are substantially identical (except for projection 20 and socket 21), the rounded ends of the ears engage the lateral portions of the T-shaped upper arm 11 when the jaws are fully closed (FIGURE 8).

The relative dimensions of the socket opening and the projection are such that the projection passes freely into the open socket when the jaws are closed. Once it has passed into the socket, the projection or tongue 20, by engagement with upstanding ears 22, prevents lateral movement of the arms and lateral displacement of the jaws. From FIGURE 3 it will be observed that the combined length of tongue 20 and ears 22 is greater than the distance between the ribs 16 of the respective arms when those ribs are disposed in parallel relation and, therefore, the tongue is partially seated within the socket prior to contact between the jaws on closing.

If desired, the outer surfaces of the arms 11 and 12 may be provided with transverse ridges 23 so that the instrument may be firmly gripped and easily manipulated by a user.

Socket 21 and tongue or projection 20 are particularly important because of the plastic construction of the forceps. Since the plastic structure does not have either the strength or the stiffness of steel construction, a user, by applying sufficient force, may shift the jaws laterally out of alignment, assuming that the projection is not received within the socket. However, a relatively weak force is required to urge the arms and jaws into the partially closed positions shown in FIGURE 3 since the entire flexure of the arms occurs in the unreinforced areas adjacent connecting portion 13. It is only after the tips of the jaws have come into contact (FIGURE 3) that a substantial force must be applied to produce further closing of those jaws. The reason, as already explained, is that to bring the jaws 14 and 15 into fully closed positions it is necessary to flex or bow the arms 11 and 12 inwardly until the opposing surfaces of their respective ribs 16 are in mutual engagement. However, from the time that the jaws first contact each other (FIGURE 3) until they are substantially fully closed (FIGURE 8) the projection or tongue 20 is slidably received within the socket 21 and, therefore, the cooperative relationship of these parts prevents lateral displacement of the jaws at a time when substantial force is applied to the arms. In addition, tooth 18 and longitudinal groove 19 also contribute in preventing relative lateral movement of the jaws after they have been urged into contact with each other.

The embodiment of FIGURE 9 is identical to the form already described in connection with FIGURES 1 through 8 except for the arrangement of teeth 17'. As shown in FIGURE 9, teeth 17' are arranged in a herringbone pattern, each tooth having lateral portions which extend forwardly and inwardly along the face of each jaw and which meet along the vertical longitudinal mid plane thereof. The teeth of jaws 14' and 15' mesh when the jaws are closed in the manner illustrated in FIGURES 3 and 7 with reference to the previously-described embodiment and, since the teeth do not extend at right angles to the longitudinal vertical mid plane of the jaws, intermeshing contact between the teeth prevent relative lateral displacement of those jaws upon closing.

In both of the tooth arrangements illustrated in the drawings sutures or the like which extend transversely with reference to the jaws may be firmly gripped by the teeth. In the first form of FIGURES 1 through 8, the suture would cross the groove 19 and the longitudinal tooth 18 and, when the jaws are closed, would be kinked and tightly gripped thereby. Similarly, in the second form of FIGURE 9, a suture extending in a straight line between the jaws cannot drop into a groove where slippage might occur but instead must cross the teeth and, by conforming generally to the uneven contour of those teeth, is firmly held therebetween.

While in the foregoing specification we have disclosed an embodiment of the invention in considerable detail for purposes of illustration, it will be understood by those skilled in the art that many of these details may be varied without departing from the spirit and scope of the invention.

We claim:

1. In a pair of forceps formed from plastic material, a pair of flexible plastic arms of generally T-shaped cross section having longitudinal ribs extending along the inner opposing surfaces thereof, said arms being provided with opposing jaws at the free ends thereof and having their opposite ends maintained in spaced relation by a connecting portion formed integrally therewith, said ribs diminishing in height adjacent said connecting portion, whereby, the stiffening effect of said ribs diminishes adjacent said connecting portion, said arms having their intermediate portions substantially unflexed when said jaws are partially closed and having said intermediate portions flexed and bowed inwardly towards each other when said jaws are fully closed, said jaws when partially closed engaging each other at their tips and having their opposing faces diverging rearwardly, said jaws when fully closed having their faces in substantially full mutual engagement, and means provided by said arms for preventing relative lateral displacement of said arms and jaws when said jaws are partially to fully closed.

2. The structure of claim 1 in which said means comprises a projection provided by one of said arms and extending in the direction of jaw movement towards the other of said arms, said other of said arms being provided with a socket adapted to slidably receive said projection when said jaws are partially to fully closed.

3. A plastic forceps having a pair of flexible arms having their ends at one end of said forceps maintained in spaced relation by a connecting portion formed integrally therewith, said arms being provided with a pair of opposing jaws at the opposite free ends thereof, said jaws normally being spaced apart but being urged into mutual engagement when said arms are squeezed together, said arms also having integral ribs extending along the inner opposing surfaces thereof substantially the entire longitudinal extent of said arms between said jaws and said connecting portion to stiffen the intermediate portions of said arms, said arms having their intermediate portions substantially unflexed when said jaws are partially closed and having said intermediate portions bowed inwardly towards each other when said jaws are fully closed, said jaws when partially closed engaging each other at their tips and having their opposing faces diverging rearwardly, said ribs diminishing in cross sectional dimensions adjacent said connecting portion, one of said arms having a projection extending in the direction of jaw movement towards the other of said arms, and said other arm being provided with a socket adapted to receive said projection when said arms have been moved together sufficiently for initial contact between said jaws, said projection being slidably movable in said socket to guide said arms and jaws together as the intermediate portions of said arms are bowed inwardly to bring the jaws into full mutual engagement.

References Cited in the file of this patent

UNITED STATES PATENTS

| | | |
|---|---|---|
| 1,095,564 | Engelsman | May 5, 1914 |
| 1,128,135 | Hammond | Feb. 9, 1915 |
| 1,198,958 | Risley | Sept. 19, 1916 |
| 1,356,048 | Dederer | Oct. 19, 1920 |
| 2,082,062 | Johnson | June 1, 1937 |
| 2,406,393 | Neugass | Aug. 27, 1946 |
| 2,706,987 | Bramstedt | Apr. 26, 1955 |
| 2,842,132 | Soltero et al. | July 8, 1958 |
| 2,962,919 | Grundmann et al. | Dec. 6, 1960 |

FOREIGN PATENTS

| | | |
|---|---|---|
| 20,743 | Austria | July 25, 1905 |
| 133,750 | Switzerland | Dec. 16, 1929 |